United States Patent [19]

Yasumatsuya

[11] 3,774,068

[45] Nov. 20, 1973

[54] VERTICAL DEFLECTION DEVICE

[75] Inventor: Noboru Yasumatsuya, Kadoma, Japan

[73] Assignee: Matsuhita Electric Industrial Co., Ltd., Osaka, Japan

[22] Filed: Nov. 30, 1970

[21] Appl. No.: 93,775

[30] Foreign Application Priority Data

Dec. 6, 1969 Japan ............................ 44/98144
Dec. 24, 1969 Japan ............................ 44/104098

[52] U.S. Cl. ............................ 315/27 TD
[51] Int. Cl. ............................ H01j 29/70
[58] Field of Search ............................ 315/27 TD, 28, 29

[56] References Cited

UNITED STATES PATENTS

| | | | |
|---|---|---|---|
| 3,111,603 | 11/1963 | Marshall, Jr. et al. | 315/27 TD |
| 3,343,006 | 9/1967 | Attwood | 315/27 TD |
| 3,392,302 | 7/1968 | Schneider | 315/27 TD |

OTHER PUBLICATIONS

IBM Technical Disclosure (Vol. 11, No. 10, 3/69), p. 1365 – R. J. Froess

*Primary Examiner*—Leland A. Sebastian
*Assistant Examiner*—J. M. Potenza
*Attorney*—Stevens, Davis, Miller & Mosher

[57] ABSTRACT

A vertical deflection device in which an output terminal of a single-ended push-pull circuit is connected with a deflection coil and a closed circuit is formed in which said deflection coil is included but not a transistor which constitutes said single-ended push-pull circuit during a blanking period, thereby to cause a free oscillation in said closed circuit with small attenuating resistance.

3 Claims, 10 Drawing Figures

N. YASUMATSUYA
INVENTOR

BY Stevens, Davis, Miller & Mosher
ATTORNEYS

VERTICAL DEFLECTION DEVICE

A single-ended push-pull (hereinafter referred to as SEPP) vertical deflection circuit with transistors which is used for the deflection of electron beams in a Braun tube of a television receiver, unlike a class-A vertical deflection circuit connected with a transformer, has advantages in that there is no need for a vertical output transformer and class-B operations are possible, contributing to improved efficiency. However, the disadvantage of the SEPP vertical deflection circuit is a longer blanking period and, to overcome this disadvantage, it has been suggested that a transistor be connected in series with a parallel circuit consisting of a diode and a capacitor to generate an oscillating current during the blanking period. In spite of such a measure, however, the resistance loss in the oscillating circuit is not negligible so that the oscillating current flowing through a deflection coil is attenuated with the blanking period still remaining long.

Accordingly, it is an object of the present invention to provide an SEPP vertical deflection circuit with a shorter blanking period by constructing a circuit in which the internal resistance of a transistor to which said resistance loss is partly attributable is negligibly small.

The above and other objects, features and advantages will be made apparent by the detailed description of preferred embodiments taken in conjunction with the accompanying drawings, in which.

Figure 1:
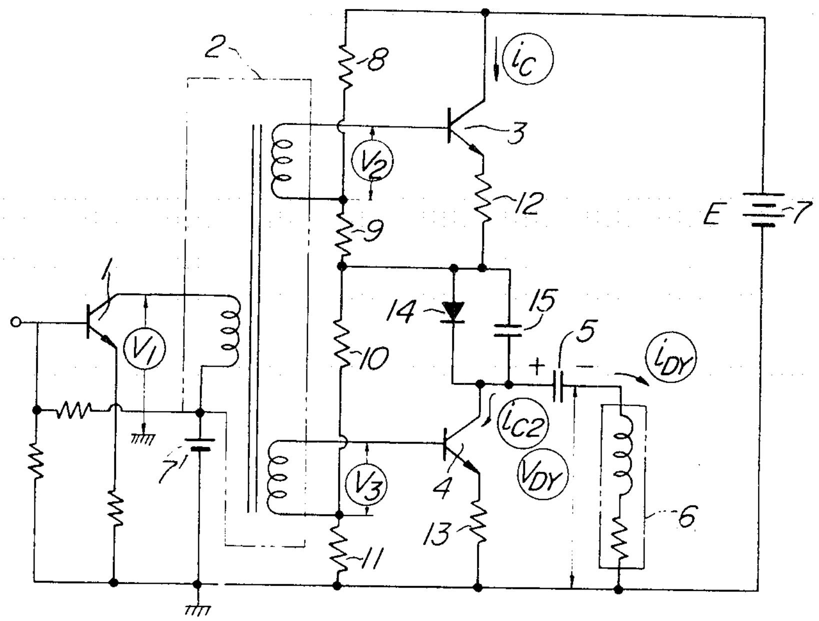
FIG. 1 PRIOR ART
FIG. 1 is an electric wiring diagram showing the essential components of a conventional vertical deflection device.

Referring to FIG. 1 which shows an example of the conventional class-B SEPP vertical deflection circuit, numeral 1 shows a drive transistor, numeral 2 a phase-inverting drive transformer, numerals 3 and 4 output transistors, numeral 5 a coupling capacitor, numeral 6 a vertical deflection coil and numerals 7 and 7' power supplies. Resistances 8, 9, 10 and 11 are for supplying an appropriate bias current to the transistors 3 and 4, while resistors 12 and 13 are inserted to improve the thermal stability of the circuit. The functions of a diode 14 and a capacitor 15 cause an oscillation circuit to develop from a closed circuit with the vertical deflection coil 6 during a blanking period.

Figure 2:
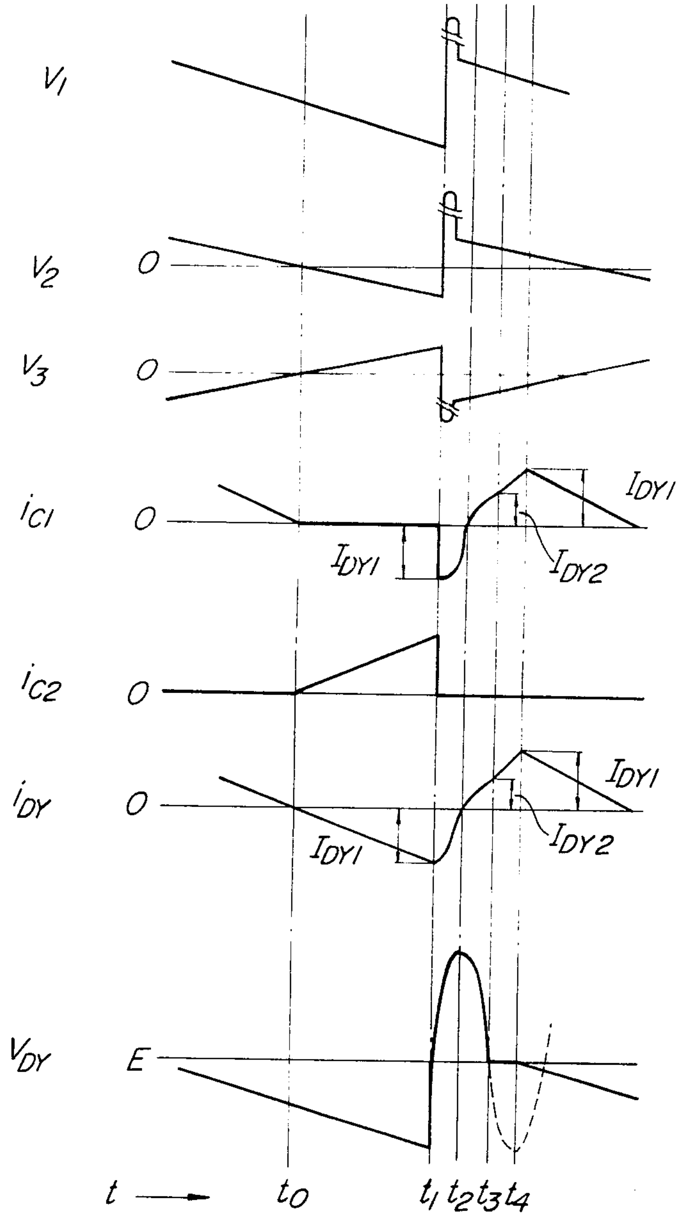
FIG. 2 PRIOR ART
FIG. 2 is a diagram for explaining the operation of the conventional vertical deflection device as shown in FIG. 1.

The operation of the above-mentioned circuit will now be explained with reference to FIG. 2. A sawtooth voltage with a positive gradient is applied to the base of the drive transistor 1, so that a voltage $v_1$ is generated across the primary winding of the phase-inverting drive transformer 2 connected with the collector of said drive transistor 1. The secondary of the phase-inverting drive transformer 2 is connected with the bases of the output transistors 3 and 4. Their respective base voltages $v_2$ and $v_3$ have such polarities that, as shown in FIG. 2, the output transistor 3 is energized during the first half of a scanning and the output transistor 4 is energized during the last half thereof. At time $t_0$, the collector current $iC_1$ of the output transistor 3 becomes zero, cutting off said transistor with a reverse bias applied between the base and emitter thereof. On the other hand, a forward bias is applied between the base and emitter of the output transistor 4 which has remained cut off until time $t_0$, and hence the collector current $ic_2$ gradually increases. The output transistor 4 is suddenly cut off at time $t_1$, when the current $i_{DY}$ which had been flowing in the deflection coil 6 begins to flow in a closed circuit consisting of the capacitor 15, transistor 3, power supply 7, deflection coil 6 and coupling capacitor 5. This closed circuit constitutes an equivalent series resonance circuit consisting of L, C and R respectively showing the inductance, capacitance and resistance portions of said closed circuit, whereby the current $i_{DY}$ in the deflection coil 6 freely oscillates at the natural frequency $f$ of the circuit, which is $$f = [1/(2\pi)] \sqrt{(1/LC) - (R/2L)^2} \quad (1)$$

provided however that the condition $R < 2\sqrt{L/C}$ has to be satisfied.

During the period of free oscillation of the current $i_{DY}$, positive sine-wave pulses which are higher than the source voltage E as shown in FIG. 2 are produced across the deflection coil 6, so that the diode 14 is supplied with a reverse bias and cut off. During the scanning period, a forward bias is applied to the diode 14 and therefore the capacitor 15 remains short-circuited. Also, a voltage with a different polarity from the one under normal operating conditions is applied between the collector and emitter of the output transistor 3, that is to say, the potential of the emitter is higher than that of the collector with the result that conduction is maintained between the collector and emitter.

The deflection current $i_{DY}$ which began free oscillation at time $t_1$ flows first from emitter to collector of the output transistor 3 but becomes zero at time $t_2$, after which the current is reversed and flows from collector to emitter thereof. At time $t_3$ and when a half cycle of the free oscillation ends, the polarity of the pulse voltage produced in the deflection coil becomes negative as shown by the dotted line and the diode 14 is made to conduct, thereby stopping the free oscillation. Let the deflection current at the starting point of the free oscillation be $I_{DY1}$, and the deflection current at the end thereof be $I_{DY2}$. Then $$I_{DY1} > I_{DY2}$$

This is due to the resistance loss in the oscillation circuit. Generally, it is necessary in class-B operations to make equal the collector peak currents of the transistors 3 and 4. For this purpose, a sufficient amount of base current has to be supplied to the output transistor 3 at time $t_3$ so as to rapidly increase the deflection coil current $i_{DY}$ or $i_{C1}$ from $I_{DY2}$ to $I_{DY1}$. At this time, however, the direction of the back electromotive force generated in the inductance of the deflection coil is such that the output transistor 3 is made to conduct, i.e., the emitter is positive as against the collector, and therefore the voltage $v_{DY}$ is clamped to the source voltage E. As a result, the output transistor which conducts does not operate normally, so that the variation in $i_{C1}$ is equivalent to the case in which a DC voltage E/2 is applied to the series circuit consisting of the inductance L and resistance R with an initial current value of $I_{DY2}$. That is to say, the rate of increase in $i_{C1}$ with time is $$[(E/2)/L] \epsilon^{-(R/L)t} \quad (2)$$

After reaching $I_{DY1}$ at time $t_4$, $i_{C1}$ begins to decrease and the output transistor 3 starts normal operations.

The reason why the blanking period from $t_1$ to $t_4$ is long in the conventional SEPP vertical deflection circuit is that since $I_{DY2}$ is smaller than $I_{DY1}$ due to the resistance in the oscillating circuit, the period $t_3$ to $t_4$ develops during which there is an upward slope of $(E/2L) \epsilon^{-(R/L)t}$. It will be noted from the above that the blanking period thus lengthened is a disadvantage of the conventional SEPP vertical deflection circuit.

The present invention which is aimed at obviating these disadvantages has an object of shortening the blanking period by causing free oscillations in a closed circuit with a deflection coil.

Another object of the present invention is to construct a closed circuit by which the said free oscillations can be effectively performed.

Still another object of the present invention is to construct said closed circuit in accordance with various arrangements of the deflection output circuit.

Figure 3:
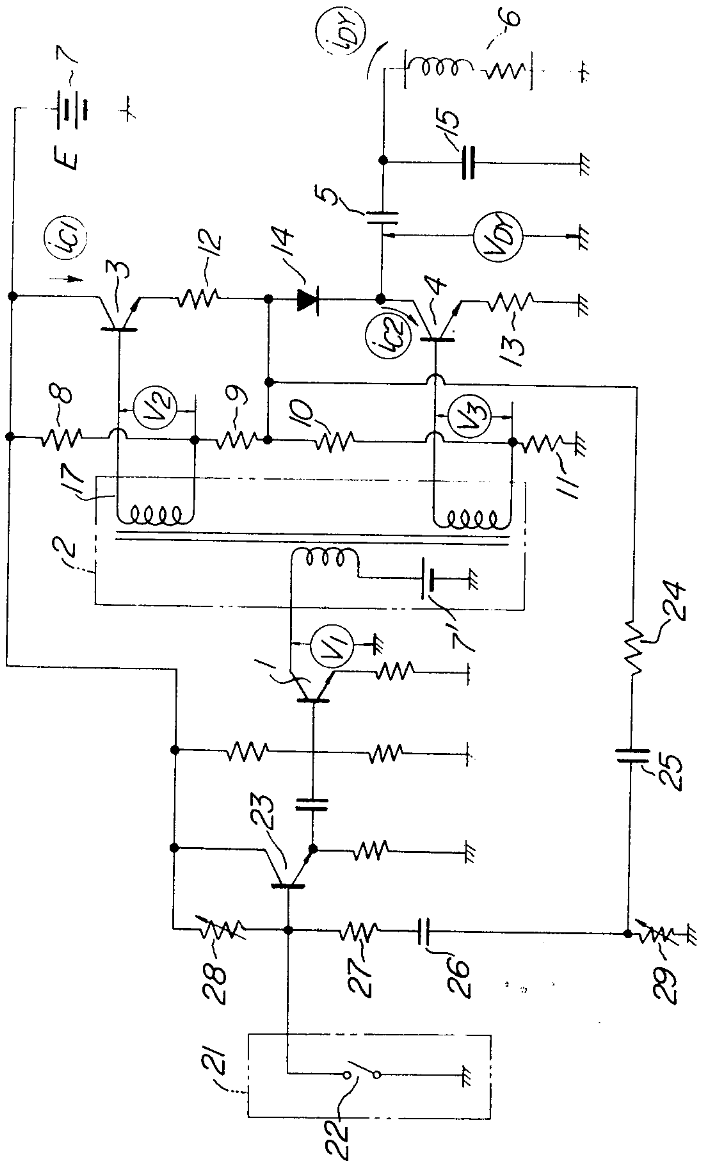
FIG. 3 is an electric wiring diagram showing an embodiment of the vertical deflection device according to the present invention.

Embodiments of the present invention will now be explained. The embodiment of the present invention as shown in FIG. 3 greatly differs from the device shown in FIG. 1 in that in the former the capacitor 15 constituting an oscillating circuit is connected in parallel with the deflection coil 6. Also, there some other elements added in the device of FIG. 3 to meet the practical requirements. The elements with the same functions as those shown in FIG. 1 are denoted by the same numerals in FIG. 3 and will not be explained here. In the figure, numeral 21 shows a blocking oscillation circuit, numeral 22 an equivalent switch thereof and numeral 23 an amplifying transistor. The base of transistor 23 is connected with the junction point between the resistor 12 and diode 14 through the resistor 24, capacitors 25 and 26 and resistor 27 to generate a sawtooth voltage. The resistor 28 is inserted between the base of the transistor 23 and the power supply 7. In this circuit arrangement, a sawtooth voltage is obtained at the base of transistor 23 by making the switch 22 conduct for a certain period in a certain cycle. This is generally called a Miller integration circuit by which a sawtooth voltage with good linearity can be obtained. The amplitude and linearity of the sawtooth wave can be controlled by means of the resistors 28 and 29 respectively.

The basic idea of the present invention is to shorten the period from $t_3$ to $t_4$ by lowering the resistance as far as possible and approximating $I_{DY2}$ of FIG. 2 as closely to $I_{DY1}$ as possible in a free oscillation circuit constructed during a blanking period.

Figure 4:
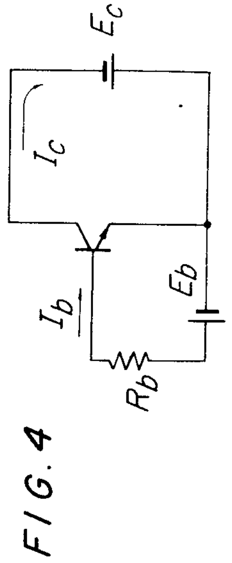
FIGS. 4 and 5 are diagrams for explaining the operation of the vertical deflection device as shown in FIG. 3.
Figure 5:
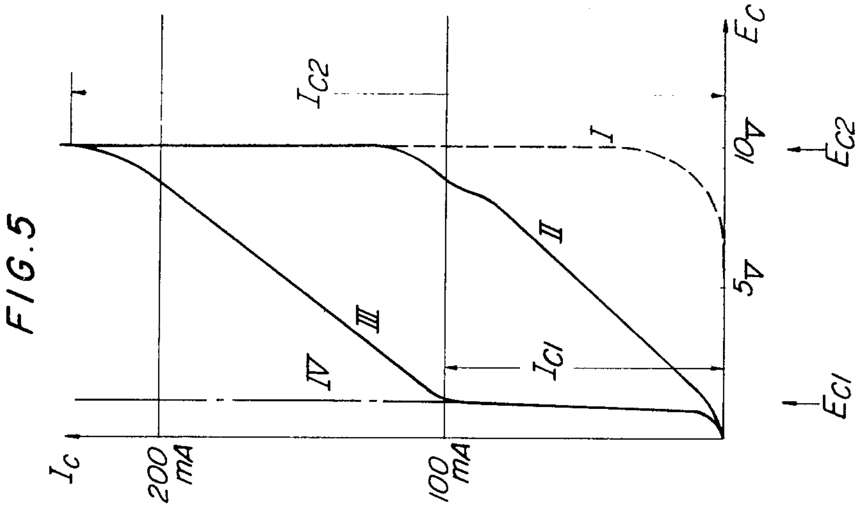

As a result of the inventor's study, it has been discovered that although the resistance of the output transistor 3 which together with the deflection coil 6, coupling capacitor 5, capacitor 15 and power supply 7 makes up a free oscillation circuit had been considered to be zero, it actually shows a considerably high value under a certain condition. In other words, when a voltage of a reverse polarity to that under normal conditions is applied between the collector and emitter of the transistor 3 as shown in FIG. 4 and a forward current is supplied to the base thereof, the voltage-current characteristic between the collector and emitter assumes curves as shown in FIG. 5. In this figure, curve I shows a state in which the base current $I^b$ is zero and the resistance R$b$ is infinite, that is, the base is opened and a reverse voltage is applied between the emitter and collector. Curve II indicates a state where Eb is zero (Ib is not zero) and R$b$ is 200Ω, whereas curve III shows a state where E$b$ is applied under the condition of curve II to increase I$b$ by about 50 mA. Curve IV shows a forward characteristic of the junction between the base and collector.

In curve III, an equivalent resistance between the collector and emitter of the transistor is very low in value until $I_c$ reaches $I_{c1}$, while it is pretty high between $I_{c1}$ and $I_{c2}$. The value of $I_{c1}$ is about 2 to 5 times as high as the base current although it depends on the kind of the transistor and the base current. On the other hand, the value of resistance between $I_{c1}$ and $I_{c2}$ depends on the kind of transistor employed but is one-fifth to one-half the resistance between the base and emitter as when E$b$ is zero. Also, the values of $E_{c1}$ and $E_{c2}$ depend on the kind of the transistor employed.

Referring again to FIG. 1 which shows a conventional device, a free oscillation begins in said closed circuit as the output transistor 4 is cut off. During the first quarter of a cycle of the free oscillation, the output transistor 3 operates along the characteristic curve III as shown in FIG. 5. In other words, the emitter voltage is higher than the collector voltage, the base current flows from base to emitter and the resistance between the base and emitter becomes a combined value (let it be R$x$) of the resistance of the secondary winding 17 of the phase-inverting transformer 2 and the resistors 9 and 12. This R$x$ usually reaches several of 10Ω to several hundreds Ω and the base current at the starting point of the free oscillation is much smaller than the collector current, the ratio between them being one to several of tens, so that the resistance value between $I_{c1}$ and $I_{c2}$ becomes considerably high, attenuating the free oscillation.

In the next quarter of a cycle, a current flows from collector to emitter of the transistor 3. If the base current is small, the transistor is not energized in its saturation region and therefore the internal resistance becomes high, thus attenuating the free oscillation.

The embodiment of the present invention as shown in FIG. 3 has no output transistor 3 in a free oscillation circuit for the blanking period and therefore the attenuation of the free oscillation due to the above-mentioned causes does not occur, so that the period from $t_3$ to $t_4$ of the $i_{DY}$ curve shown in FIG. 2 becomes shorter.

The operation of the embodiment as shown in FIG. 3 will now be explained with reference to FIG. 2. At time $t_0$, the output transistor 3 is cut off and the output transistor 4 begins to conduct. At time $t_1$ when the transistor 4 is cut off, the deflection current $i_{DY}$ which had thus far flowed in the deflection coil 6 begins to oscillate in a closed circuit comprising the deflection coil 6 and capacitor 15. As a consequence, a positive voltage $v_{DY}$ is developed across the deflection coil 6, which voltage exceeds the source voltage E, thereby cutting off the diode 4. At time $t_3$ when one-half cycle of the free oscillation ends, the deflection current $i_{DY}$ flows in the direction opposite to that at time $t_1$. Then the polarity of $v_{DY}$ is almost turned negative. But since the diode 14 begins to conduct, the oscillation stops and the deflection current $i_{DY}$ increases at the rate of $(E/2L)\ \epsilon^{-(R/L)t}$ like the conventional device from $I_{DY2}$ to $I_{DY1}$ because of the base current of the output transistor 3. The $i_{DY}$ curve follows the same pattern as in the conventional device after time $t_4$.

As will be evident from the above description, since the free oscillation circuit has no output transistor 3, there is no attenuation of the free oscillation caused by the output transistor 3 with the result that the difference between $I_{DY1}$ and $I_{DY2}$, namely, the period between $t_3$ and $t_4$ becomes smaller, making it possible to obtain a sawtooth current with a short blanking period.

The capacitor 15 in FIG. 13 operates the same way even if it is inserted between the collector of the output transistor 4 and the earth, because the value of the coupling capacitor 5 is generally 100 to 1,000 times as high as that of the capacitor 15.

Although the above description was concerned with a class-B SEPP circuit employing a phase-inverting transformer, the circuit of FIG. 3 can be made to operate class-A or class AB by controlling the biases of the output transistors 3 and 4 by means of the resistors 8, 9, 10 and 11. It is evident that in this case, like the class-B operation, the present invention can be effectively applied.

Figure 6:
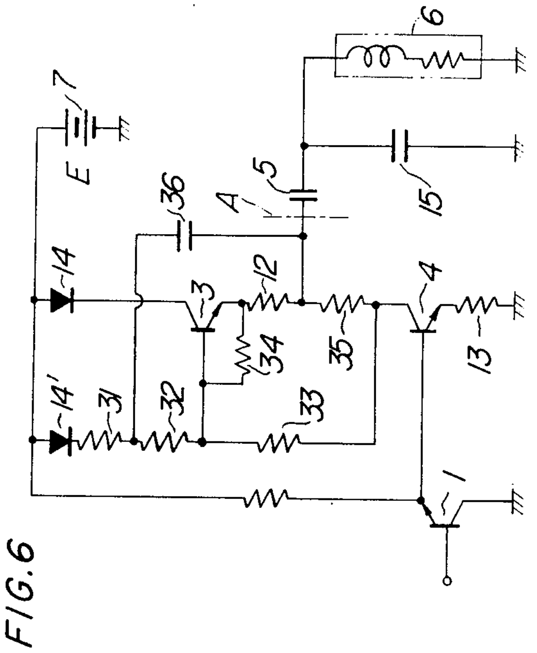
FIGS. 6 to 10 are electric wiring diagrams showing other different embodiments of the present invention.

The present invention as applied to a class-A self-phase-inverting SEPP vertical deflection circuit without employing any phase-inverting transformer is shown in FIG. 6. In this figure, the elements which function in the same way as those in FIG. 3 are marked with the same numerals. In this embodiment, a free oscillation also occurs in a closed circuit consisting of the deflection coil 6 and capacitor 15 with the blanking period diodes 14 and 14' cut off. In the conventional device which has a parallel connection of the capacitor 15 and the diode 14, the output transistor 3 is included in a free oscillation circuit and for this reason the free oscillation is attenuated by the internal resistance of the output transistor 3. But according to the present invention, the internal resistance of the output transistor does not affect the free oscillation, so that a short blanking period is obtained.

In this circuit, an output voltage is usually fed back to the junction point of the bias resistors 31 and 32 through the capacitor 36 in order to improve the linearity. Therefore, the impedance on the left side of point A is a combined value of the capacitor 36 and resistor 31 which causes the attenuation of the said free oscillations, even if both the output transistor 4 and diode 14 are cut off. However, by inserting the diode 14' in the manner as shown in FIG. 6, the free oscillation is not affected during the blanking period when a reverse bias is applied to the diode 14' like the diode 14.

Figure 7:
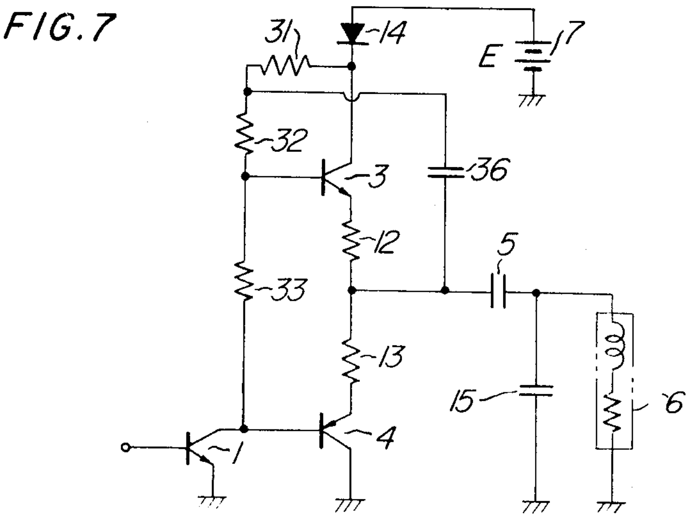

FIG. 7 shows an embodiment of the invention as applied to a class-B SEPP vertical deflection circuit which has a combination of PNP- and NPN-type transistors to easily drive an output transistor. In this figure, elements with similar functions are marked with the same numerals as in the previous drawings, because there is no fundamental difference between class A and class B operations. Therefore, the operations of the elements contained in this embodiment are the same as those in FIG. 6, except that the diode 14 also acts as the diode 14'.

Figure 8:
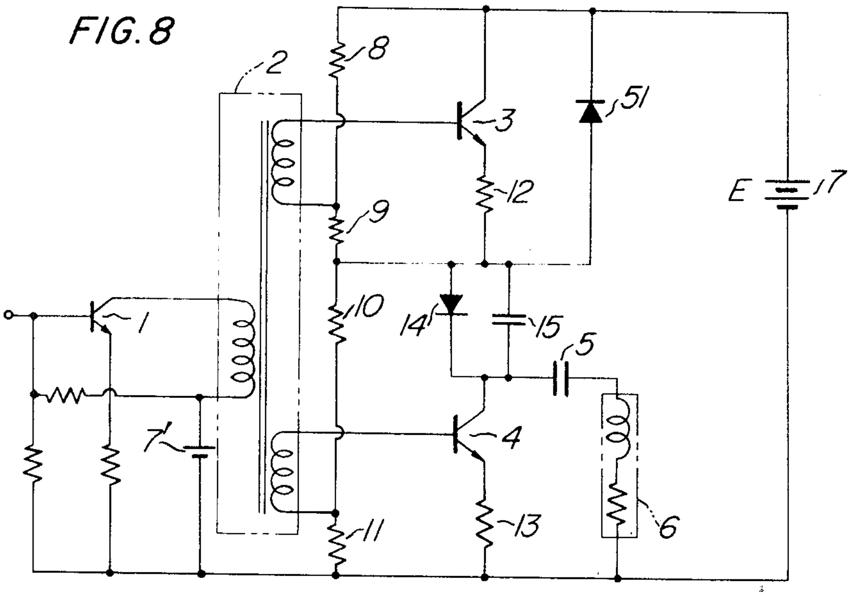

Explanation will be made now of still another embodiment shown in FIG. 8. This embodiment differs from that of FIG. 1 in that in this embodiment the diode 51 is connected with the collector of the output transistor 3 and the anode of the diode 14 in the direction as shown in the figure. No explanation will be made of the other elements which function the same way as those in FIG. 1 and marked with the same numerals.

A time $t_1$ of FIG. 2 when the output transistor 4 is suddenly cut off, the current flowing in the deflection coil 6 begins free oscillation in a closed circuit consisting of the deflection coil 6, coupling capacitor 5, capacitor 15, diode 51 and power supply 7. During the first quarter of a free oscillation cycle or the period from $t_1$ to $t_2$, no current flows in the output transistor 3, because the current $i_{DY}$ in the deflection coil flows from anode to cathode of the diode 14. Therefore, the free oscillation is not attenuated by an equivalent resistance of the transistor between $I_{C1}$ and $I_{C2}$ in FIG. 5.

Free oscillation during the period from $t_2$ to $t_3$ occurs in a closed circuit in which the diode 51 is replaced by the output transistor 3. In this case, a current flows from collector to emitter, causing the flow of a forward base current, so that the transistor is energized in a saturation region and therefore its saturation resistance is very small with the result that the free oscillation is attenuated very little.

As can be seen from above, the free oscillation is less attenuated in this embodiment than in the conventional device and therefore the difference between $I_{DY1}$ and $I_{DY2}$, namely, the period between $t_3$ and $t_4$ becomes smaller, thus making possible a class-B SEPP vertical deflection circuit with a shorter blanking period. Incidentally, the diode 51 is supplied with a reverse bias and therefore maintained cut off during a scanning period.

Figure 9:
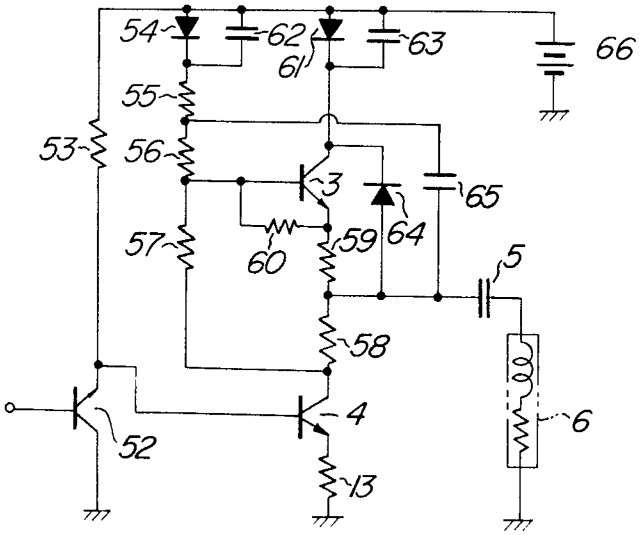

FIG. 9 shows an application of the present invention to a class-A SEPP vertical deflection circuit without using any phase-inverting transformer, which is the same as the conventional circuit except that a diode 64 is inserted between the collector of the transistor 3 and the coupling capacitor 5. Numeral 52 shows a drive transistor, numeral 53 a load resistor thereof, numeral 54 a diode connected in parallel with the capacitor 62, numerals 55, 56 and 57 resistors connected in series, numerals 58 and 59 resistors connected in series with the transistors 3 and 4, numeral 60 a resistor inserted between the base and emitter of the transistor 3, numeral 61 a diode connected in parallel with the capacitor 63, numeral 64 a diode with its output terminal connected with the collector of transistor 3, numeral 65 a large-value capacitor and numeral 66 a power supply.

Also in this embodiment, the current in the deflection coil 6 freely oscillates in a closed circuit described below during a blanking period in the manner as described with reference to FIG. 3. During the first quarter of a free oscillation cycle, the deflection coil 6, coupling capacitor 5, diode 64, capacitor 63 and power supply 66 are included, while during the next quarter the transistor 3 takes the place of the diode 64. As a consequence, less attenuation is caused during the period of free oscillation for the reasons mentioned with reference to FIG. 8, thereby shortening the blanking period.

Figure 10:
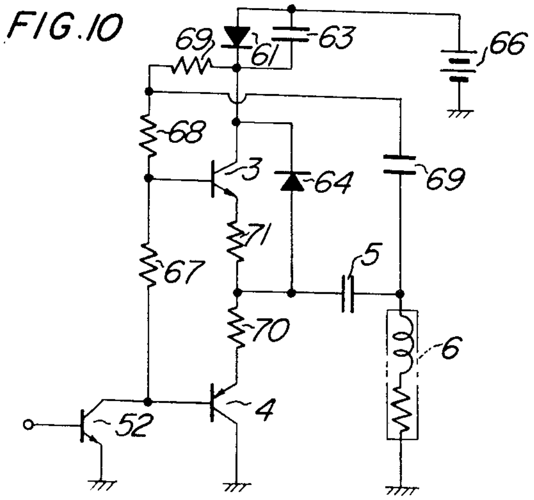

Still another embodiment of the present invention as applied to a class-B SEPP vertical deflection circuit with a combination of PNP- and NPN-type transistors to simplify a drive circuit is illustrated in FIG. 10. In this figure, essential elements are marked in the same way as those in FIG. 9 and therefore no explanation thereof will be made. Numerals 67, 68 and 69 show resistors in series and numerals 70 and 71 resistors inserted between the emitters of the transistors 3 and 4.

It will be understood from the above description that according to the present invention the attenuation of free oscillation in an SEPP vertical deflection circuit during a blanking period is shortened thereby to supply a sawtooth current with a shorter blanking period to a deflection coil. The characteristic values or brands of the component elements of the circuit as shown in FIGS. 8, 9 and 10 will be listed below for reference.

i. In FIG. 8

| Numerals | Char. values or brands | Numerals | Char. values or brands |
|---|---|---|---|
| 3 | 2SD199 | 11 | 33Ω |
| 4 | 2SD199 | 12 | 2.2Ω |
| 5 | 200μF | 13 | 2.2Ω |
| 6 | 100 mH. 150Ω | 14 | FRIM |
| 7 | 170 V | 15 | 0.22μF |
| 8 | 4.7 K Ω | 51 | FRIM |
| 9 | 33Ω | 7' | 24V |
| 10 | 4.7 220 ΩK Ω560 Ω220 Ω | | |

ii. In FIG. 9

| Numerals | Char. values or brands | Numerals | Char. values or brands |
|---|---|---|---|
| 3 | 2SD199 | 58 | 6.8 Ω |
| 4 | 2SD199 | 59 | 2.7 Ω |
| 5 | 100μF | 60 | 330 Ω |
| 6 | 20 mH, 20Ω | 61 | FRIM |
| 52 | 2SC696 | 62 | 1μF |
| 53 | 560 Ω | 63 | 1μF |
| 54 | FRIM | 64 | FRIM |
| 55 | 220 Ω | 65 | 200μF |
| 56 | 560 Ω | 66 | 40 V |
| 57 | 220 Ω | | |

iii. In FIG. 10

| Numerals | Char. values or brands | Numerals | Char. values or brands |
|---|---|---|---|
| 3 | 2SC696A | 66 | 40 V |
| 4 | 2SA546A | 67 | 100 Ω |
| 5 | 100μF | 68 | 3.9 K Ω |
| 6 | 200 mH, 20 Ω | 69 | 3.3 K Ω |
| 52 | 2SC696 | 70 | 2.2 Ω |
| 61 | FRIM | 71 | 2.2 Ω |
| 63 | 1μF | | |
| 64 | FRIM | | |

What is claimed is:

1. A vertical deflection device, comprising: a single-ended push-pull circuit including:

first and second transistors, and a first diode connected in series with said transistors and caused to conduct during a scanning period;

a deflection coil connected in parallel with said first transistor, said coil generating pulse voltages during at least a part of a blanking period to cut off said first diode;

a capacitor connected in parallel with said first diode;

a second diode coupled across the collector - emitter circuit of said second transistor; and means supplying said second diode with a reverse bias voltage during said scanning period and a forward bias voltage during the period when said first diode is cut off.

2. A vertical deflection device according to claim 1, in which the collector of the second transistor is connected with a power supply through said parallel circuit including said first diode and said capacitor, the base of the second transistor being connected with said power supply through a bias circuit having a parallel circuit including a third diode and a second capacitor, said third diode being biased in the forward direction during said scanning period and in the reverse direction during the period in which the first diode is cut off.

3. A vertical deflection device according to claim 1, in which the collector of the second transistor and a base bias circuit is connected with a power supply through said first diode common to the collector of the second transistor and said base bias circuit, said first diode being supplied with a forward bias voltage during the scanning period and a reverse bias voltage during the period in which the first diode is cut off.

* * * * *